US009693189B2

United States Patent
Caldwell et al.

(10) Patent No.: US 9,693,189 B2
(45) Date of Patent: *Jun. 27, 2017

(54) SYSTEM AND METHOD FOR DETERMINING A SUBSCRIBER'S ZONE INFORMATION

(71) Applicant: T-Mobile USA, Inc., Bellevue, WA (US)

(72) Inventors: Christopher E. Caldwell, Woodstock, GA (US); Janne P. Linkola, Brooklyn, NY (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/565,123

(22) Filed: Dec. 9, 2014

(65) Prior Publication Data

US 2016/0165392 A1    Jun. 9, 2016

(51) Int. Cl.
| | | |
|---|---|---|
| *H04W 4/02* | (2009.01) | |
| *H04W 64/00* | (2009.01) | |
| *H04W 4/24* | (2009.01) | |
| *H04W 48/18* | (2009.01) | |
| *H04L 29/08* | (2006.01) | |

(Continued)

(52) U.S. Cl.
CPC ............ *H04W 4/021* (2013.01); *H04L 67/16* (2013.01); *H04W 4/24* (2013.01); *H04W 48/18* (2013.01); *H04W 64/003* (2013.01); *H04W 4/06* (2013.01); *H04W 80/04* (2013.01); *H04W 84/042* (2013.01); *H04W 84/12* (2013.01); *H04W 88/08* (2013.01)

(58) Field of Classification Search
CPC ..... H04W 84/12; H04W 84/18; H04W 80/04; H04W 8/26; H04W 88/06
See application file for complete search history.

(56) References Cited

U.S. PATENT DOCUMENTS

| | | |
|---|---|---|
| 5,724,660 A | 3/1998 | Kauser et al. |
| 6,002,679 A | 12/1999 | Liu et al. |

(Continued)

FOREIGN PATENT DOCUMENTS

| | | |
|---|---|---|
| EP | 1583374 A1 | 10/2005 |
| EP | 2051556 | 4/2009 |

(Continued)

OTHER PUBLICATIONS

"Enabler Release Definition for Secure UserPlane for Location," Candidate Version 1.0, Open Mobile Alliance, Jan. 22, 2007, 17 pages.

(Continued)

*Primary Examiner* — Maharishi Khirodhar
*Assistant Examiner* — Sanjay K Dewan
(74) *Attorney, Agent, or Firm* — Perkins Coie LLP (57) ABSTRACT

Systems and methods for delivering customized content to wireless service subscribers are disclosed. According to the disclosed embodiments, wireless access points can be grouped into various zones. Some of all of these zones can be further associated with predefined service types or other customized attributes. When a wireless subscriber connects to an access point in a given zone, the subscriber can be provided with content and/or services based on the zone to which he is connected.

20 Claims, 4 Drawing Sheets

(51) Int. Cl.
*H04W 4/06* (2009.01)
*H04W 80/04* (2009.01)
*H04W 84/12* (2009.01)
*H04W 88/08* (2009.01)
*H04W 84/04* (2009.01)

(56) References Cited

U.S. PATENT DOCUMENTS

| | | | |
|---|---|---|---|
| 6,104,712 A | 8/2000 | Robert et al. | |
| 6,119,012 A | 9/2000 | Amirijoo | |
| 6,222,483 B1 | 4/2001 | Twitchell et al. | |
| 6,249,252 B1 | 6/2001 | Dupray | |
| 6,252,545 B1 | 6/2001 | Da et al. | |
| 6,463,288 B1 | 10/2002 | Havinis et al. | |
| 6,542,819 B1 | 4/2003 | Kovacs et al. | |
| 6,603,976 B1 | 8/2003 | Amirijoo et al. | |
| 6,603,978 B1 | 8/2003 | Carlsson et al. | |
| 6,665,611 B1 | 12/2003 | Oran et al. | |
| 6,671,514 B1 | 12/2003 | Cedervall et al. | |
| 6,690,659 B1 | 2/2004 | Ahmed et al. | |
| 6,711,417 B1 | 3/2004 | Gorman et al. | |
| 6,801,778 B2 | 10/2004 | Koorapaty et al. | |
| 7,151,941 B2 | 12/2006 | Vänttinen et al. | |
| 7,158,500 B2 | 1/2007 | Annamalai | |
| 7,177,399 B2 | 2/2007 | Dawson et al. | |
| 7,187,923 B2 | 3/2007 | Mousseau et al. | |
| 7,194,354 B1 | 3/2007 | Oran et al. | |
| 7,245,900 B1 | 7/2007 | Lamb et al. | |
| 7,272,500 B1 | 9/2007 | Walker | |
| 7,283,822 B2 | 10/2007 | Gallagher et al. | |
| 7,304,985 B2 | 12/2007 | Sojka et al. | |
| 7,313,143 B1 | 12/2007 | Bruno | |
| 7,317,910 B2 | 1/2008 | Niemenmaa et al. | |
| 7,336,668 B2 | 2/2008 | Adams | |
| 7,336,962 B2 | 2/2008 | Levitan | |
| 7,353,034 B2 | 4/2008 | Haney | |
| 7,369,859 B2 | 5/2008 | Gallagher | |
| 7,433,673 B1 | 10/2008 | Everson et al. | |
| 7,436,789 B2 | 10/2008 | Caliskan et al. | |
| 7,466,986 B2 | 12/2008 | Halcrow et al. | |
| 7,577,431 B2 | 8/2009 | Jiang | |
| 7,593,605 B2 | 9/2009 | King et al. | |
| 7,606,555 B2 | 10/2009 | Walsh et al. | |
| 7,610,011 B2 | 10/2009 | Albrett | |
| 7,613,155 B2 | 11/2009 | Shim | |
| 7,620,404 B2 | 11/2009 | Chesnais et al. | |
| 7,640,008 B2 | 12/2009 | Gallagher et al. | |
| 7,653,394 B2 | 1/2010 | McMillin | |
| 7,664,494 B2 | 2/2010 | Jiang | |
| 7,676,394 B2 | 3/2010 | Ramer et al. | |
| 7,688,261 B2 | 3/2010 | DiEsposti | |
| 7,714,778 B2 | 5/2010 | Dupray | |
| 7,768,963 B2 | 8/2010 | Alizadeh-Shabdiz | |
| 7,856,315 B2 | 12/2010 | Sheha et al. | |
| 7,903,029 B2 | 3/2011 | Dupray | |
| 7,904,096 B2 | 3/2011 | Shyr et al. | |
| 7,949,326 B2 | 5/2011 | Gallagher et al. | |
| 7,974,639 B2 | 7/2011 | Burroughs et al. | |
| 8,116,291 B2 | 2/2012 | Annamalai et al. | |
| 8,145,183 B2 | 3/2012 | Barbeau et al. | |
| 8,213,957 B2 | 7/2012 | Bull et al. | |
| 8,311,557 B2 | 11/2012 | Annamalai | |
| 8,364,746 B2 | 1/2013 | Annamalai et al. | |
| 8,369,266 B2 | 2/2013 | Jin et al. | |
| 8,509,731 B2 | 8/2013 | Kholaif et al. | |
| 8,571,043 B2 | 10/2013 | Horner | |
| 8,693,454 B2 | 4/2014 | Annamalai et al. | |
| 8,718,592 B2 | 5/2014 | Annamalai | |
| 8,737,311 B2 | 5/2014 | Jin et al. | |
| 8,908,664 B2 | 12/2014 | Caldwell et al. | |
| 2002/0019698 A1 | 2/2002 | Vilppula et al. | |
| 2002/0064141 A1 | 5/2002 | Sakakura | |
| 2002/0077144 A1* | 6/2002 | Keller | H04W 8/245 455/550.1 |
| 2002/0123354 A1 | 9/2002 | Nowak | |
| 2003/0009385 A1 | 1/2003 | Tucciarone et al. | |
| 2003/0016648 A1 | 1/2003 | Lindsay et al. | |
| 2003/0032404 A1* | 2/2003 | Wager | H04L 41/12 455/406 |
| 2003/0058844 A1 | 3/2003 | Sojka et al. | |
| 2003/0074471 A1 | 4/2003 | Anderson et al. | |
| 2003/0095069 A1 | 5/2003 | Stilp | |
| 2003/0139182 A1 | 7/2003 | Bakkeby et al. | |
| 2003/0216143 A1 | 11/2003 | Roese et al. | |
| 2003/0222819 A1 | 12/2003 | Karr et al. | |
| 2004/0062264 A1 | 4/2004 | Adams | |
| 2004/0076157 A1 | 4/2004 | Sojka et al. | |
| 2004/0087315 A1 | 5/2004 | Dufva et al. | |
| 2004/0102196 A1 | 5/2004 | Weckstrom et al. | |
| 2004/0114577 A1 | 6/2004 | Sojka et al. | |
| 2004/0122730 A1 | 6/2004 | Tucciarone et al. | |
| 2004/0142704 A1 | 7/2004 | Scholz | |
| 2004/0157590 A1 | 8/2004 | Lazaridis et al. | |
| 2004/0162896 A1 | 8/2004 | Cen et al. | |
| 2004/0166856 A1 | 8/2004 | Niemenmaa | |
| 2004/0198386 A1 | 10/2004 | Dupray | |
| 2004/0202120 A1 | 10/2004 | Hanson | |
| 2004/0202194 A1 | 10/2004 | Annamalai | |
| 2004/0203853 A1 | 10/2004 | Sheynblat | |
| 2004/0203915 A1 | 10/2004 | van Diggelen et al. | |
| 2004/0224702 A1 | 11/2004 | Chaskar | |
| 2004/0240430 A1 | 12/2004 | Lin et al. | |
| 2004/0259566 A1 | 12/2004 | Maanoja et al. | |
| 2005/0003831 A1 | 1/2005 | Anderson | |
| 2005/0059415 A1 | 3/2005 | Easo et al. | |
| 2005/0066044 A1 | 3/2005 | Chaskar et al. | |
| 2005/0070306 A1 | 3/2005 | Kim et al. | |
| 2005/0075116 A1 | 4/2005 | Laird et al. | |
| 2005/0079821 A1 | 4/2005 | Bi | |
| 2005/0130673 A1 | 6/2005 | Annamalai | |
| 2005/0136943 A1 | 6/2005 | Banerjee et al. | |
| 2005/0138144 A1 | 6/2005 | Sethi | |
| 2005/0148342 A1 | 7/2005 | Sylvain | |
| 2005/0153687 A1 | 7/2005 | Niemenmaa et al. | |
| 2005/0159153 A1 | 7/2005 | Mousseau et al. | |
| 2005/0170851 A1 | 8/2005 | Melpignano et al. | |
| 2005/0181805 A1 | 8/2005 | Gallagher | |
| 2005/0186948 A1 | 8/2005 | Gallagher et al. | |
| 2005/0192024 A1 | 9/2005 | Sheynblat | |
| 2005/0255866 A1 | 11/2005 | Dupuy et al. | |
| 2005/0272424 A1 | 12/2005 | Gallagher et al. | |
| 2005/0286466 A1 | 12/2005 | Tagg et al. | |
| 2006/0009235 A1 | 1/2006 | Sheynblat et al. | |
| 2006/0014517 A1 | 1/2006 | Barclay et al. | |
| 2006/0014548 A1 | 1/2006 | Bolin et al. | |
| 2006/0015513 A1 | 1/2006 | Poyhonen et al. | |
| 2006/0025158 A1 | 2/2006 | Leblanc et al. | |
| 2006/0029296 A1 | 2/2006 | King et al. | |
| 2006/0030290 A1 | 2/2006 | Rudolf et al. | |
| 2006/0052115 A1 | 3/2006 | Khushu | |
| 2006/0062363 A1 | 3/2006 | Albrett | |
| 2006/0098899 A1 | 5/2006 | King et al. | |
| 2006/0105776 A1 | 5/2006 | Burke | |
| 2006/0121916 A1 | 6/2006 | Aborn et al. | |
| 2006/0172732 A1 | 8/2006 | Nylander et al. | |
| 2006/0178146 A1 | 8/2006 | Lee et al. | |
| 2006/0194594 A1 | 8/2006 | Ruutu et al. | |
| 2006/0212217 A1 | 9/2006 | Sheha et al. | |
| 2006/0245406 A1 | 11/2006 | Shim | |
| 2006/0258365 A1 | 11/2006 | Cha et al. | |
| 2006/0258369 A1 | 11/2006 | Burroughs et al. | |
| 2006/0276201 A1 | 12/2006 | Dupray | |
| 2006/0286984 A1 | 12/2006 | Bonner | |
| 2006/0293066 A1 | 12/2006 | Edge et al. | |
| 2007/0032249 A1 | 2/2007 | Krishnamurthi et al. | |
| 2007/0060097 A1 | 3/2007 | Edge et al. | |
| 2007/0060114 A1 | 3/2007 | Ramer et al. | |
| 2007/0061198 A1 | 3/2007 | Ramer et al. | |
| 2007/0061242 A1 | 3/2007 | Ramer et al. | |
| 2007/0061243 A1 | 3/2007 | Ramer et al. | |
| 2007/0061244 A1 | 3/2007 | Ramer et al. | |
| 2007/0061245 A1 | 3/2007 | Ramer et al. | |
| 2007/0061246 A1 | 3/2007 | Ramer et al. | |
| 2007/0061247 A1 | 3/2007 | Ramer et al. | |

(56) References Cited

U.S. PATENT DOCUMENTS

| | | | |
|---|---|---|---|
| 2007/0061303 A1 | 3/2007 | Ramer et al. | |
| 2007/0061317 A1 | 3/2007 | Ramer et al. | |
| 2007/0072624 A1 | 3/2007 | Niemenmaa et al. | |
| 2007/0073717 A1 | 3/2007 | Ramer et al. | |
| 2007/0073718 A1 | 3/2007 | Ramer et al. | |
| 2007/0073719 A1 | 3/2007 | Ramer et al. | |
| 2007/0073722 A1 | 3/2007 | Ramer et al. | |
| 2007/0073723 A1 | 3/2007 | Ramer et al. | |
| 2007/0123237 A1 | 5/2007 | Cacioppo et al. | |
| 2007/0155489 A1 | 7/2007 | Beckley et al. | |
| 2007/0167174 A1 | 7/2007 | Halcrow et al. | |
| 2007/0178913 A1 | 8/2007 | Niemenmaa et al. | |
| 2007/0189497 A1 | 8/2007 | Bareis | |
| 2007/0192294 A1 | 8/2007 | Ramer et al. | |
| 2007/0192318 A1 | 8/2007 | Ramer et al. | |
| 2007/0198485 A1 | 8/2007 | Ramer et al. | |
| 2007/0217454 A1 | 9/2007 | Horner | |
| 2007/0239724 A1 | 10/2007 | Ramer et al. | |
| 2007/0288427 A1 | 12/2007 | Ramer et al. | |
| 2008/0009268 A1 | 1/2008 | Ramer et al. | |
| 2008/0014956 A1 | 1/2008 | Balasubramanian | |
| 2008/0045236 A1 | 2/2008 | Nahon et al. | |
| 2008/0076420 A1* | 3/2008 | Khetawat | H04W 8/04 455/435.1 |
| 2008/0076429 A1 | 3/2008 | Comstock et al. | |
| 2008/0081620 A1 | 4/2008 | Lu et al. | |
| 2008/0096594 A1 | 4/2008 | Vinding | |
| 2008/0108319 A1 | 5/2008 | Gallagher | |
| 2008/0146245 A1 | 6/2008 | Appaji | |
| 2008/0192696 A1 | 8/2008 | Sachs et al. | |
| 2008/0254810 A1 | 10/2008 | Fok et al. | |
| 2008/0280624 A1 | 11/2008 | Wrappe | |
| 2009/0005061 A1 | 1/2009 | Ward et al. | |
| 2009/0054070 A1 | 2/2009 | Gallagher et al. | |
| 2009/0171583 A1 | 7/2009 | DiEsposti | |
| 2009/0185669 A1 | 7/2009 | Zitnik et al. | |
| 2009/0275348 A1 | 11/2009 | Weinreich et al. | |
| 2009/0311987 A1 | 12/2009 | Edge et al. | |
| 2010/0069099 A1 | 3/2010 | Dunn et al. | |
| 2010/0150120 A1 | 6/2010 | Schlicht et al. | |
| 2010/0220700 A1* | 9/2010 | Hodroj | H04W 4/02 370/338 |
| 2010/0331017 A1 | 12/2010 | Ariga | |
| 2011/0039576 A1 | 2/2011 | Prakash et al. | |
| 2011/0047033 A1 | 2/2011 | Mahaffey et al. | |
| 2011/0051665 A1 | 3/2011 | Huang | |
| 2011/0111726 A1 | 5/2011 | Kholaif et al. | |
| 2011/0159886 A1 | 6/2011 | Kangas et al. | |
| 2011/0200022 A1 | 8/2011 | Annamalai | |
| 2012/0096490 A1 | 4/2012 | Barnes, Jr. et al. | |
| 2012/0116677 A1 | 5/2012 | Higgison et al. | |
| 2013/0237250 A1 | 9/2013 | Annamalai et al. | |
| 2014/0045596 A1 | 2/2014 | Vaughan et al. | |
| 2014/0295894 A1 | 10/2014 | Annamalai | |
| 2015/0181375 A1 | 6/2015 | Annamalai | |

FOREIGN PATENT DOCUMENTS

| | | |
|---|---|---|
| JP | 10239416 A | 9/1998 |
| KR | 1020040063234 A | 7/2004 |
| WO | 0027143 | 5/2000 |
| WO | 2005004520 A2 | 1/2005 |
| WO | 2005004528 | 1/2005 |
| WO | 2005060292 | 6/2005 |
| WO | 2006102784 A1 | 10/2006 |

OTHER PUBLICATIONS

"Google Search of Location of Mobile," http://www.google.com/search?q=location+mibile&sourceid=ie7&rls=com.microsoft:en-us:IE-SearchBox&ie=&oe= [Last Accessed Jun. 8, 2010], 2 pages
"IP Multimedia Subsystem," Wikipedia, http://wikipedia.org/wiki/IP_Multimedia_Subsystem, 13 pages [Last Accessed May 5, 2010].
"Secure User Plane for Location Requirements," Candidate Version 1.0, Open Mobile Alliance, Jun. 16, 2006, 80 pages.
"Secure UserPlane for Location Architecture," Candidate Version 1.0, Open Mobile Alliance, Jan. 22, 2007, 80 pages.
"The 3GPP Standard for Convergence-Diagram," UMA Universal Mobile Access, http://www.umatoday.com/img/diagrams/umaServices.jpg, [First Accessed Oct. 17, 2007], 1 page.
"The 3GPP Standard for Convergence-Dual Mode Handsets," UMA Universal Mobile Access, UMA Today, 2007, 2 pages.
"The 3GPP Standard for Convergence-Femtocells," UMA Universal Mobile Access, UMA Today, 2007, 2 pages.
"The 3GPP Standard for Convergence-Softmobiles," UMA Universal Mobile Access, UMA Today, 2007, 2 pages.
"The 3GPP Standard for Convergence-Terminal Adaptors," UMA Universal Mobile Access, UMA Today, 2007, 2 pages.
"UserPlane for Location Protocol," Candidate Version 1.0, Open Mobile Alliance, Jan. 22, 2007, 56 pages.
Annamalai, Magesh, "Method and Delivery of UMA Value Added Location Services Via Supl," U.S. Appl. No. 60/853,086, filed Oct. 20, 2006, 15 pages.
Dyoub, J. et al., "Dueling Architectures: Control plane vs. User-plane," HP invent, 2004, 2 pages.
European Patent Office, Extended European Search Report, EP Patent Application 06826444.9, mailed Sep. 12, 2012, 8 pages.
European Patent Office, Extended European Search Report, EP Patent Application 07760606.9, mailed Jan. 23, 2013, 8 pages.
Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.
International Search Report and Written Opinion, International Application No. PCT/US2007/82133, Applicant: T-Mobile USA, Inc., Filed on Oct. 22, 2007, Date Mailed Apr. 29, 2008, 9 pages.
International Search Report and Written Opinion, International Application No. PCT/2006/41226, Filed on Oct. 20, 2006, Applicant: T-Mobile USA, Inc., Date of Mailing: Dec. 4, 2007, 18 pages.
International Search Report and Written Opinion, International Application No. PCT/2007/82156, Filed on Oct. 22, 2007, Applicant: T-Mobile USA, Inc., Date of Mailing: May 28, 2008, 12 pages.
International Search Report and Written Opinion, International Application No. PCT/2007/66579, Filed on Apr. 12, 2007, Applicant: T-Mobile USA, Inc., Date of Mailing Sep. 9, 2008, 9 pages.
International Search Report and Written Opinion, International Application No. PCT/US2007/82136, Applicant: T-Mobile USA, Inc., Filed on Oct. 22, 2007, Date Mailed Mar. 11, 2008, 11 pages.
International Search Report and Written Opinion, International Application No. PCT/US2010/035010, Applicant: T-Mobile USA, Inc., Filed on May 14, 2010, Date Mailed Dec. 22, 2010, 10 pages.
International Search Report and Written Opinion, International Application No. PCT/US2010/035014, Applicant: T-Mobile USA, Inc., Filed on May 14, 2010, Date Mailed Dec. 28, 2010, 11 pages.
Martin-Escalona, et al., "Delivery of Non-Standardized Assistance Data in E-OTD/GNSS Hybrid Location Systems," IEEE 2002, pp. 1-5.
Raja, K., et al., "We Know," IEEE Communication Engineer, Jun./Jul. 2004, 6 pages.
Schulzrinne et al. "Emergency Services for Internet Telephony Systems," Oct. 18, 2004, Network Working Group, Internet Draft, pp. 1-20.
Spinney, Jonathan, "Wireless Location Uses in the User Plane and Control Plane," The Location Based Services Community, Jun. 27, 2005, 3 pages.
Steinfeld, "The Development of Location Based Services in Mobile Commerce," Elife after the dot.com bust, Berlin, Springer, 2004, pp. 1-15.
European Patent Office, Extended European Search Report, EP Patent Application 10775643.9, mailed Dec. 1, 2016, 10 pages.
European Patent Office, Extended European Search Report, EP Patent Applicathn 07868537.7, mailed Mar. 7, 2017, 9 pages.

* cited by examiner

SYSTEM AND METHOD FOR DETERMINING A SUBSCRIBER'S ZONE INFORMATION

CROSS-REFERENCE TO RELATED APPLICATIONS

The present application is a continuation application of U.S. application Ser. No. 13/154,365, filed Jun. 6, 2011, now U.S. Pat. No. 8,908,664; which is a continuation of U.S. application Ser. No. 12/446,451, filed Apr. 20, 2009; which is a U.S. National Stage Application of PCT Application No. PCT/US2007/082156, filed Oct. 22, 2007; which claims benefit of U.S. Provisional Application No. 60/853,156, filed Oct. 20, 2006; all of which are incorporated herein in their entireties by reference.

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM)) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN, or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users have the opportunity to provide additional customized services. For example, a WiFi access point to which IP-based wireless telecommunications subscribers are connected may be interesting to a service provider because certain assumptions can be made about the subscribers using that access point. If a service provider could effectively and efficiently take action based assumptions derived from on how or where an IP-based wireless telecommunications subscriber was connected, the wireless user experience could be enhanced measurably.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. Additional details of the systems and methods described below are provided in co-pending PCT Application No. PCT/US2006/41225, filed on Oct. 20, 2006, titled "SYSTEM AND METHOD FOR RATING AN IP-BASED WIRELESS TELECOMMUNICATION BASED ON ACCESS POINT," hereby incorporated by reference.

Sample Network Configurations

Figure 1:
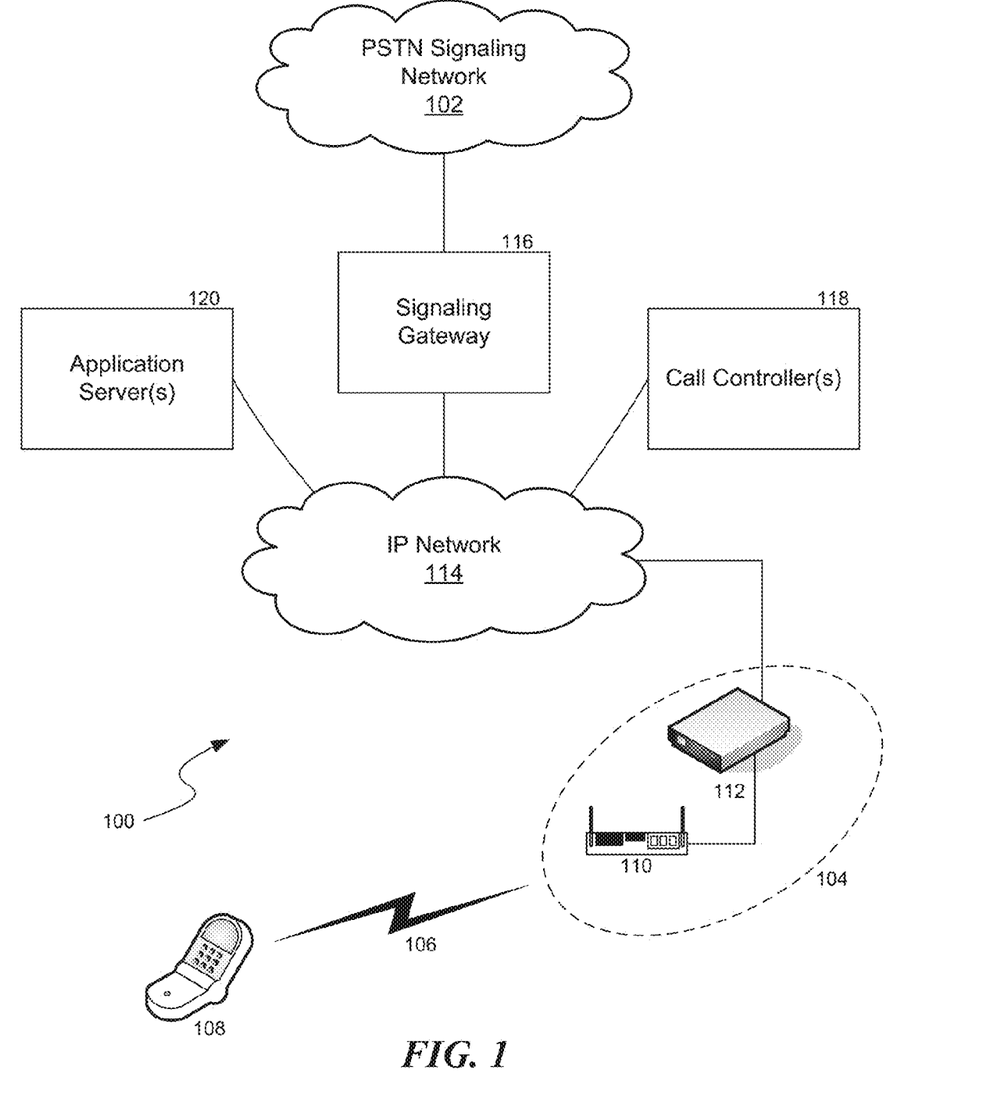
FIG. 1 illustrates aspects of a sample network system that allows VoIP-based communications in conjunction with a public switched telephone network (PSTN).
Figure 2:
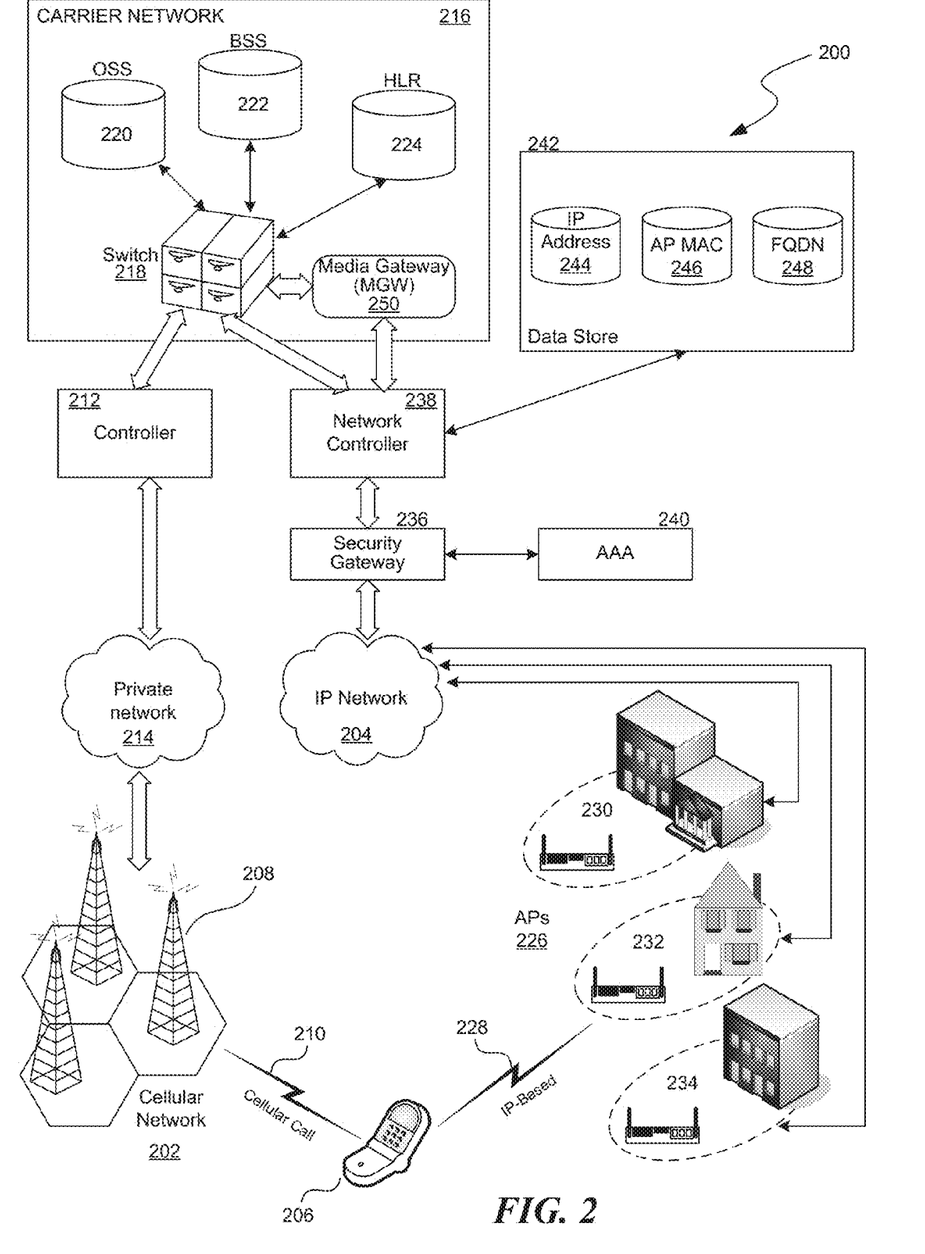
FIG. 2 illustrates an example converged wireless network system that combines a cellular network with an IP-based wireless telecommunications network.

FIGS. 1 and 2 show sample network system configurations in which aspects of an access point management facility can be implemented in accordance with various embodiments. In general, one purpose of the access point management facility is to manage groups of WiFi access points, and the service types and subscribers associated with those access points.

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In some embodiments, aspects of the zone information may be determined with the mapping and processes, as described in more detail below with respect to FIGS. 3-4. In this example, a telecommunication service provider manages both the call controller 118 and the application server 120.

FIG. 2 illustrates a sample network system 200 in which aspects of the access point access point management facility can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206. Such service may include voice services, and also supplementary services such as call forwarding and call waiting, text messaging services (e.g., SMS), and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 240 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 242. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (MI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

Service Zones Overview

The system and methods described herein can be used to translate WiFi access points and broadband Internet networks into arbitrary aggregations, or zones, and then provide associated functions or services, such as corresponding customized services to subscribers. Service zones can be used in a wide variety of ways to customize a subscriber's experience. These features can be used to, for example, indicate the availability of free calls to a subscriber, or to indicate location specific information to the subscriber such as "Happy Holidays from your favorite department store" when the subscriber is in that store. In UMA embodiments, the UMA protocol or specification includes a "UMA Service Zone" (USZ) field. The appropriate USZ information can be found from a database using any combination of parameters. These parameters can include, as non-limiting examples, Service Zone, Service Type, date, week day, and time of day.

Service zones could be aggregations, clusters or sets of access points, typically identified by the MAC address or IP address of the associated WiFi access point, or another designator in converged cellular-IP embodiments, such as a proximate cellsite global indicator (CGI). For example, a single zone could include thousands of WiFi access points around the world, such as access points located in worldwide retail locations of a particular business. In UMA embodiments, the USZ field can be used to specify particular service zones that could be associated with specific service types. As non-limiting examples, services that can be provided may be favorable billing rates, free services (e.g., free downloadable songs or other digital content), location-based services associated with that zone (e.g., cafeteria menu associated with a cafeteria within that zone), and so forth. Zones may also be mapped to individual subscribers, so that employees within a given zone would receive certain benefits or content, whereas visitors would not.

These zones can be implemented by use of a database in the network that associates a zone designator to one or more access points or regions. Further, the database may associate particular subscribers to particular services for that zone. Subscribers may be identified uniquely by any of a variety of designators, such as mobile station or subscriber ID (such as an international mobile subscriber identifier, or IMSI), or other identifier. The database can also link to specific content or services, as well as associated rules for providing that content/service.

Implementation Description

In UMA implementations, the UMA specification supports a UMA Service Zone (USZ) field for "UMA Service Zone Information." This field is returned to the mobile device by the UMA Network Controller (UNC) during registration. A purpose of the UMZ Service Zone Information element is to provide the mobile station with UMA Service Zone information applicable to the current location of the user. It can include at least two fields: UMA Service Zone Name string can be used by the UNC to indicate textual information related to the location, and UMA Service Zone Icon Indicator can be used by the UNC to turn on various indicators in the mobile station.

The USZ can depend on any combination of mobile device location and subscriber identity. Using the systems and methods disclosed herein, the subscriber's WiFi location can be mapped into Service Zones in the UNC, a subscriber's Service Type can be provisioned from Customer Care/Billing Systems to the UNC, and the appropriate USZ information can be found from a database using a combination of Service Zone, Service Type, date, week day, and time of day as keys. Thus, WiFi service zone information can be used in conjunction with other data such as subscriber Service Type, date, day of week, time of day as keys into a database that stores the possible UMS Service Zone information. When the subscriber registers with the network, the appropriate USZ is determined from this database. Thus, USZ could depend on both location and subscriber. Some or all of the mappings described herein can be performed through the use of one or more databases.

Figure 3:
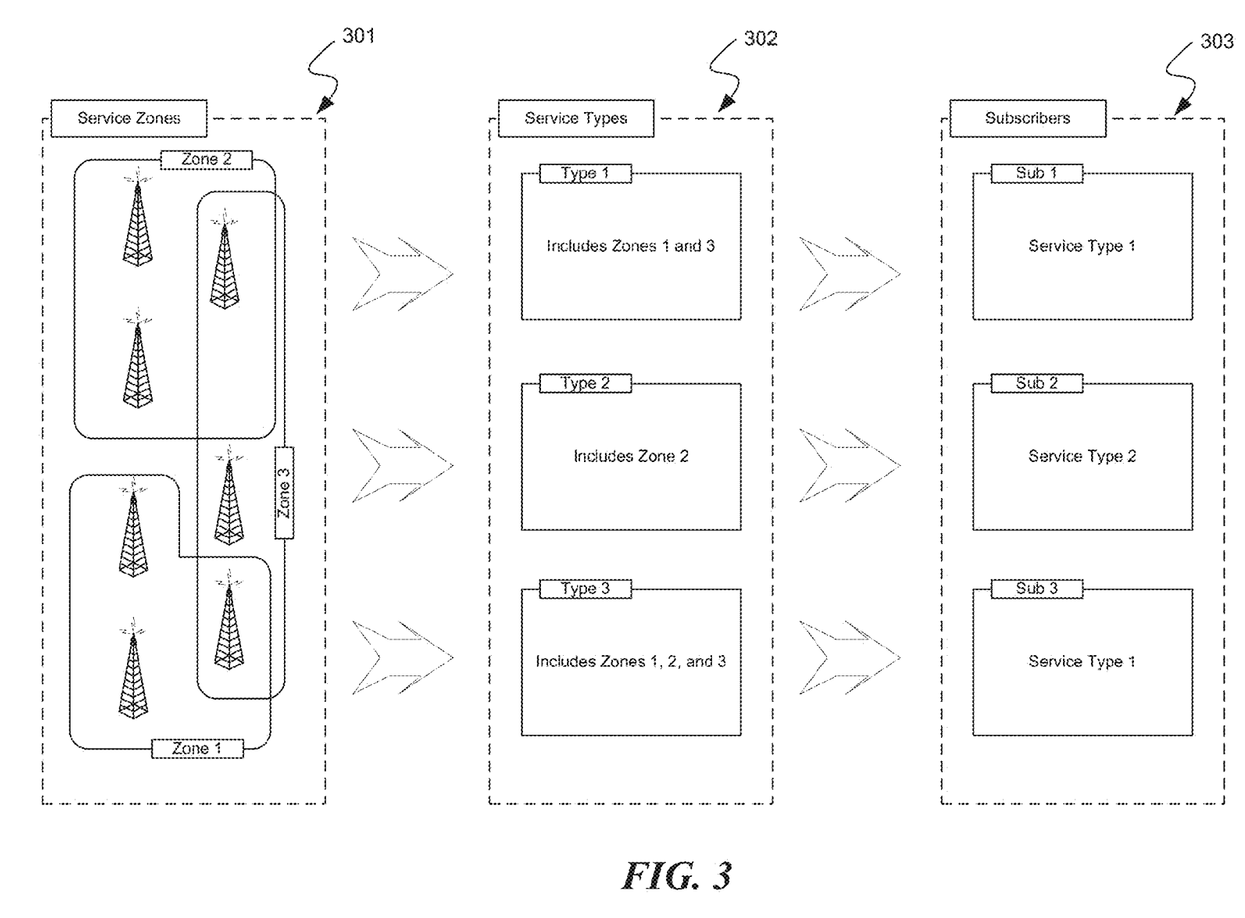
FIG. 3 illustrates an example mapping from service zones, to service types, to subscribers.

The systems and methods described herein could be implemented in the following manner, as illustrated in FIG. 3:

1. Map WiFi location to WiFi zone (301). In this step or block, physical access points and broadband networks can be mapped to Service Zones (clusters). As non-limiting examples, a service zone can be defined in any of three ways: (1) by access point MAC address or collection of access point MAC addresses, (2) by IP address or range of IP addresses, or (3) by fully qualified domain name (FQDN) or partial FQDN matches. In some embodiments, service zones can be associated with a CellID. The CellID is reported through to the billing system so that the subscriber's call is rated correctly. In some embodiments, the mapping of WiFI locations to WiFi zones can be performed in the UNC. Additionally, the subscriber's WiFi location can be mapped into a Service Zone in the UNC.

The Service Zones may be defined in a database associated with the network, such as the data store 242, or customer care or billing system databases (not shown). As noted below, a table or other data structure associates a number or other zone identifier with one or more IP address, MAC addresses, FQDNs, etc. Other Internet Protocol or non-Internet Protocol schemes could be used. In some embodiments, one or more CellIDs may be used. The zone need not be contiguous or overlapping APs, but could be scattered throughout a region, state, country, etc.

2. Map WiFi zone to service type (302). In this step or block, the subscriber's Service Type is provisioned to or by the system. An example of a service type might be "Microsoft location specific campus plan for Redmond." Another might be "non-location specific regular plan." A subscriber's Service Type can be provisioned from the Customer Care and Billing System to the UNC. Thus, a subscriber on the Microsoft campus might receive a preferential billing plan. Or, customized content could be pushed to the phone based on this information, such as a menu of a nearby restaurant.

Again, service types may be defined in a database associated with the network, such as the data store 242. As noted herein, one or more service types may be defined in a table or other data structure, where one or more service types may be associated with each service zone defined in step (301). Indeed, a given service zone may have multiple service types, which may include specific billing rates, delivery of certain content (e.g. content geographically related to the zone), advertisements, and/or rules. As one example, rules may relate to filtering, screening, or security for providing data/communications to/from mobile stations in the zone. Further, other data may assist in defining an appropriate service type, such as time of day, day of week, etc.

3. Map subscriber to service type (303). In this step or block, when the subscriber registers with the network, an appropriate USZ is fetched from a database by using mapped service zone information and the user Service Type. Also, in some embodiments, different time specific qualifiers can be used to determine the USZ to use. Examples of such qualifiers could be the current date, day of week and/or time of day. For example, a USZ textual message such as "Happy Holidays," or "Good Morning" could be sent to the subscriber.

Again, subscribers may be previously associated with service types and defined in a database associated with the network, such as the data store 242. As noted herein, one or more subscribers may be identified by any known subscriber or handset identifier, such as IMEI, IMSI, SIM Number, SSN, mobile phone number, etc. A subscriber identified in the database may be associated with one or more zones/service types in a table or other data structure. Thus, in one example, employees may be identified and associated with an employer in the database so that those employees received certain services when within the employer's service zone.

While the three steps or blocks described above are illustrated in a certain sequential order, they could be performed in any sequence or order, and of course other steps or block may be included. By execution of these mapping steps, access points can be flexibly mapped or grouped. As discussed above, they can be grouped by MAC address, IP address, or FQDN, into WiFi locations zones which can then be used in conjunction with the subscriber's Service Type to determine an appropriate USZ to return to the subscriber.

UMA Zones Database

As illustrated in the table below, the UMA Zones database can store groups of access points, IP addresses, and/or fully qualified domain names (FQDN). The database can be keyed to a unique integer field called a Zone Number. Records in the database can store at least one type of information, such as access point MAC address(es), IP address(es) or FQDN (s). For example, a database could be used to indicate that a certain retail establishment name is associated with certain MAC addresses. It is possible to store individual values, ranges of values, or use wild card values in any of the records. For example, a record may include a single URI such as wabod01s01.t-mobile.com, or it could be stored in a form that captures subdomains, such as *.t-mobile.com. In the case of an IP address, it is possible to store the addresses with a subnet mask to indicate multiple IP addresses, for example, 24.16.43.0/16 or similar. It is possible to include records with duplicate or partially duplicated IP/MAC/FQDN entries with different $CGI_z$ values. Entries in the UMA Zones database can be used to indicate some or all IP addresses, some or all domains (FQDNs), some or all access points associated with a particular manufacturer or service provider, such as all T-Mobile sold access points, and some or all MAC addresses that are to be used in default zones. In some embodiments, a user-friendly interface can be provided for modifying the UMA zones database.

| Field Name | Data Type | Notes |
|---|---|---|
| Zone Number | Unique integer | This is the database base key |
| Zone | <IP address range> or <MAC address range> or <FQDN range> | This defines the zone. It can be an individual address or domain or a range. |
| $CGI_z$ | Text | This is the value sent to the MSC to include in call detail records (CDRs) to indicate rating in this Zone. |
| [UMZ Service Zone Text and icon indicator] | Text | This is the string and numeric indicator for a handset icon to be sent to the mobile to be displayed on screen. |

The UMA Service Type Database

As illustrated in the table below, the UMA system can also provide a UMA service type database. This database can store the rating relationship between service types and UMA zones in the UMA Zone database. Each record in the UMA Service Type database can refer and/or be linked to multiple records in the UMA Zones database.

| Field Name | Data Type | Notes |
| --- | --- | --- |
| Service Type [Zone Number(s)] | Unique integer Zone Number (foreign key) from UMA Zones database | This is the database base key There may be a single or multiple UMA zones associated with a single service type record. |

UMA Subscriber Database

The subscriber database can include an API for external systems such as billing, IVRs, and customer care to read and write subscriber data. As illustrated in the table below, the subscriber database can be used to store subscriber profiles keyed to the IMSI. The UNC can be configured to determine the appropriate IMSI based on the IMSI that is found in the URR discovery, URR register, and URR Register Update messages received from a mobile device.

The subscriber database can store at least three enumerated fields keyed by IMSI: UMA Barring (barred/not barred), UMA service type, and UMA roaming (allowed/barred). The subscriber database can have a field for a serving UNC for a given IMSI. The subscriber database can be configured to keep MAC address/CGI pairs to enable subscriber billing on a per access point basis. The first MAC address/CGI pair is referred to as $MAC_{H1}$ and $CGI_{H1}$ respectively. Subsequent pairs are referred to as $MAC_{H2}$ and $CGI_{H2}$, etc. In some embodiments, the CGI values can include a single default value for all subscribers.

The subscriber database can include a field for storing the MSISDN associated with the IMSI. The subscriber database can store the subscriber's address, including address, city, state, and zip code. The subscriber database can also store the maximum number of MAC/CGI pairs allowed for a subscriber. In some embodiments, the subscriber database can reference an audio file. This audio file can be associated with one or more service zones and can be played back for a user when the user is in the associated service zone. The audio file can be stored either on the subscriber's mobile unit or on a network data store remote from the phone. In some embodiments, the audio can be a lossless or relatively lossless format, such as a Windows WAV file, in other embodiments the audio file can be compressed using a scheme such as MP3. The user may provide names for audio files or the files themselves, the network may provide them, or both.

A sample table illustrating the data that can be stored in the UMA subscriber database is provided below.

| Field Name | Data Type | Notes |
| --- | --- | --- |
| IMSI | Unique value | This is the database base key |
| MSISDN | Numeric | MSISDN will be used by the IVR that provisions MAC address in the subscriber database |
| UMA Barring | Boolean, Default Value is allowed | Indicates whether subscriber is allowed UMA service (home or roaming) |
| UMA Roaming | Boolean, Default Value is not allowed | Indicates whether or not subscriber is allowed UMA roaming |
| Service Type | Integer. Default value is 1 | Indicates which service type (from the UMA Service Type Database) that the subscriber subscribes to |
| Serving UNC | IP address or FQDN | Indicates the service UNC preferred for the subscriber |
| [$MAC_{H1}$, $CGI_{H1}$, UMA Service Zone text and icon indicator, Descriptor, Audio file | MAC address (hexadecimal value), CGI values, UMA Service Zone (text), Descriptor (text), Audio file (binary or base64 encoded) | Indicates a MAC address/CGI pair and the UMA Service Zone text to send to the mobile |
| Default LAC | Integer | Indicates the time zone that a call occurred in to the billing system. The Default LAC value indicates the default value to be included in the billing CDR for a subscriber if the time zone can't be determined by other means |
| [Primary Place of Use Address] | | For location purposes |
| Max Number of Access Points | Numeric | The maximum number of MAC/CGI entries allowed in the subscriber database. In some embodiments, Default = 0 |

Figure 4:
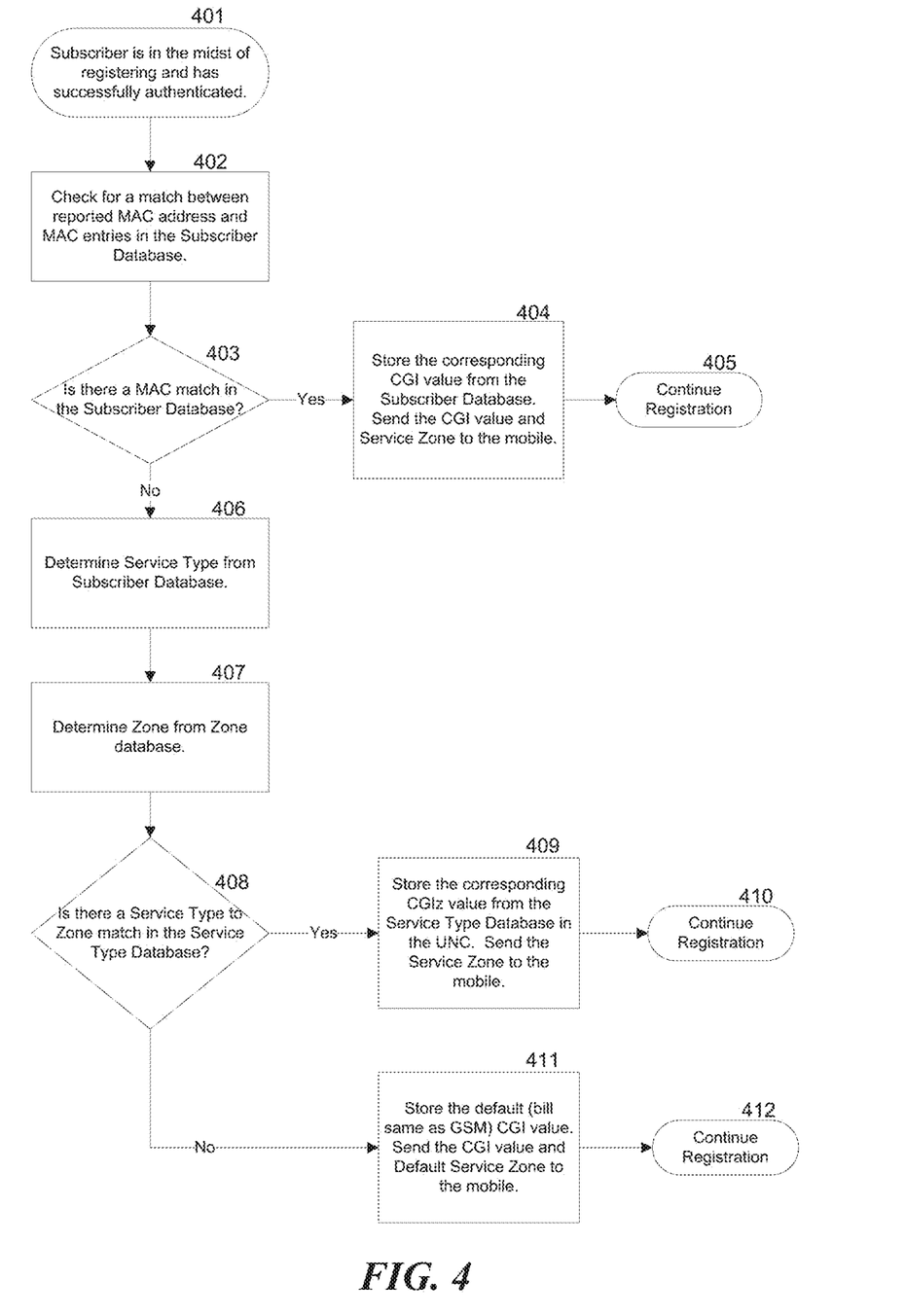
FIG. 4 illustrates an example CGI and IP-based wireless telecommunications service zone selection process.

An example method for implementing customized service types based on service zones is illustrated in the steps of FIG. 4. In step 401, the process begins when the subscriber is in the midst of registering and has successfully authenticated. In step 402, the system checks for a match between the reported MAC address and the MAC entries in the Subscriber Database. In step 403, it is determined whether there is a MAC match in the Subscriber Database. If there is a match, in step 404, the system stores the corresponding CGI value from the Subscriber Database in the UNC. The CGI value and the UMA Service Zone can be sent to the mobile device. In step 405, registration continues. If it is determined that there is no match in step 403, then, in step 406, the Service Type is determined from the Subscriber Database. In step 407, the UMA Zone is determined from the UMA Zone database.

In step 408, it is determined whether there is a Service Type to UMA Zone match in the Service Type database. If there is a match, then, in step 409, the corresponding CGIz value from the UMA Service Type database is stored in the UNC. The UMA Service Zone can be sent to the mobile device. In step 410, registration continues. If it is determined that there is no match in step 408, then, in step 411, a default CGI value is stored in the UNC. The default CGI value and default UMA Service Zone can be sent to the mobile device. Any calls or billable communications can be at then standard rates (e.g. standard GSM rates for a given service provider). In step 412, registration continues.

CONCLUSION

Many specific details of certain embodiments of the invention are set forth in the description and in FIGS. 1-4 to provide a thorough understanding of these embodiments. A person skilled in the art, however, will understand that the invention may be practiced without several of these details and that additional details can be added to the invention. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

While "WiFi" and UMA is used herein as examples, the system may employ any type of wireless protocol, including wireless local, wide and metropolitan area network (WLAN, WWAN, WMAN, respectively) access protocols. For example, wireless protocols can be based on any of the 802.11 IEEE standards. Some embodiments the system can employ Bluetooth, Ultra-wideband, WiMAX, or ZigBee protocols. Further, while a particular system employing wireless devices communicating with a network server via an AP and network (e.g. the Internet), other system configurations are possible. For example, a system can include a computer that provides a physical network link to the Internet and also provides a wireless bridge to a peripheral device (e.g., a wireless device or another computer).

The invention can be practiced with other communications, data processing, or computer system configurations. The facility can be implemented in environments other than the environments depicted in FIGS. 1 and 2. For example, the mobile telecommunications device described herein could be a non-IP-enabled mobile phone that connects to an IP-enabled access point that is connected to an IP-based telecommunications network over an IP network. As a second example, the mobile telecommunications device could be an analog telephone that connects to an IP-enabled terminal adaptor that is connected to an IP-based telecommunications network over an IP network. As a third example, the telecommunications device could be an IP-enabled softmobile (e.g., a personal computer having a USB device with an embedded SIM and UMA softphone application) that is connected to an IP-based telecommunications network over an IP network.

The telecommunications device may also include other devices, such as wearable computers, devices that perform monitoring or tracking functions, and any other device (or combination of devices) that is IP-enabled, either in hardware, software, or a combination of both hardware and software. As non-limiting examples, the mobile device could be any one or combination of Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor. Therefore, those of skill in the art will understand that various configurations are possible and that the facility can be implemented in a wide variety of environments.

Of course, aspects of the invention can be embodied in a special purpose computer or data processor (e.g. a mobile phone) that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments. Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C. sec. 112, other aspects may likewise be embodied as a means-plus-function claim. Accordingly, the inventors reserve the right to add additional claims after filing the application to pursue such additional claim forms for other aspects of the invention.

We claim:

1. In a system serving multiple wireless devices wherein the devices communicate with at least one server computer via an internet protocol (IP)-based wireless local area network (WLAN), a method associated with the providing of services, the method comprising:
   defining multiple service zones, wherein each service zone includes one or more access points associated with one or more IP-based WLANs;
   storing the defined multiple service zones;
   assigning at least one service type for each of the multiple service zones,
   wherein some of the service types for some of the service zones differ from service types for other service zones, and
   wherein at least one of the service types is not related to billing;
   storing the service types assigned to each of the multiple service zones;
   determining that one of the multiple devices is operating within one of the multiple service zones,
   wherein the one device is configured to communicate over the IP-based WLANs and over a cellular phone network under a wireless protocol;
   associating the one device with the one service zone; and,
   providing to the one device at least one of the service types assigned to the one service zone in which the one device is operating.

2. The method of claim 1, wherein the devices employ at least a portion of an Unlicensed Mobile Access (UMA), Generic Access Network (GAN), or Session Initiation Protocol (SIP) protocol to communicate with the WLAN, and wherein the one device is identified using an International Mobile Subscriber Identity (IMSI) number, a Subscriber Identity Module (SIM) number, or a mobile phone number.

3. The method of claim 1, wherein the service types assigned to the one service zone include billing rates, delivery of certain content, advertisements, or rules and wherein the certain content is based at least in part on a geographical location associated with a service zone or a time of day or day of week.

4. The method of claim 3, wherein the rules relate to filtering, screening, or security for providing data or communications to or from wireless devices in a service zone.

5. The method of claim 1, wherein each of the access points is identified using an IP address, a MAC address, a proximate Cellsite Global Indicator (COI), or a Fully Qualified Domain Name (FQDN).

6. The method of claim 1, wherein the one service zone includes a plurality of noncontiguous access points scattered throughout a geographical region.

7. The method of claim 1, wherein storing the defined multiple service zones includes storing a unique zone number integer field, wherein at least some of the definitions of the multiple service zones include service zone text and icon indicators, and wherein the service zone text and icon indicators include displayable alphanumeric strings and graphical icons sent to the one device.

8. At least one non-transitory computer-readable medium carrying a computer program to map network locations to mobile service zones, the computer program performing a method comprising:
   storing definitions of multiple service zones in a database,
   wherein each of the multiple service zone includes one or more network locations for one or more IP-based WLANs,
   wherein the database is keyed to a unique zone number integer field,
   wherein at least some of the definitions of the multiple service zones in the database include service zone test and icon indicators, and
   wherein the service zone text and icon indicators include displayable alphanumeric strings and graphical icons sent to mobile telecommunications devices;
   obtaining information of a specific network location associated with a mobile telecommunications device,
   wherein the mobile telecommunications device is configured for wireless voice communications over both a cellular network and an IP-based computer network, and
   wherein the mobile telecommunications device employs at least a portion of an Unlicensed Mobile Access (UMA), Generic Access Network (GAN), or Session Initiation Protocol (SIP) protocol to communicate with an IP-based WLAN; and
   mapping the specific network location to one of the predefined service zones.

9. The non-transitory computer-readable medium of claim 8, wherein the specific network location is identified using an IP address, a MAC address, a proximate Cellsite Global Indicator (CGI), or a Fully Qualified Domain Name (FQDN).

10. The non-transitory computer-readable medium of claim 8, wherein one of the service zones includes a plurality of non-overlapping network locations scattered throughout a geographical region.

11. The non-transitory computer-readable medium of claim 8, the method further comprising:
storing the mapping in the database;
associating the mobile telecommunications device with the one service zone; and
storing the association in the database.

12. The non-transitory computer-readable medium of claim 8, wherein the mobile telecommunications device is identified using an International Mobile Subscriber Identity (IMSI) number, a Subscriber Identity Module (SIM) number, or a mobile phone number.

13. The non-transitory computer-readable medium of claim 8, wherein the database stores for each service zone:
a Service Type Field that includes a unique service zone integer and reflects different service types, and
a Zone Number Field as a foreign key that reflects either single or multiple service zones associated with a single Service Type.

14. An apparatus for providing services, the apparatus comprising:
a processor;
a memory coupled to the processor, the memory storing instructions that when executed by the processor, cause the processor to perform a method, the method comprising:
identifying multiple service zones, wherein each service zone includes one or more access points associated with one or more internet protocol (IP)-based wireless local area networks (WLANs);
assigning at least one service type for each of the multiple service zones,
wherein some of the service types for some of the service zones differ from service types for other service zones, and
wherein at least one of the service types is not related to billing;
determining that one of multiple devices is operating within one of the multiple service zones,
wherein the one device is configured to communicate over the IP-based WLANs and over a cellular phone network under a wireless protocol;
associating the one device with the one service zone; and,
providing to the one device at least one of the service types assigned to the one service zone in which the one device is operating.

15. The apparatus of claim 14, wherein the one device employs at least a portion of an Unlicensed Mobile Access (UMA), Generic Access Network (GAN), or Session Initiation Protocol (SIP) protocol to communicate with a WLAN, and wherein the one device is identified using an International Mobile Subscriber Identity (IMSI) number, a Subscriber Identity Module (SIM) number, or a mobile phone number.

16. The apparatus of claim 14, wherein the service types assigned to the one service zone include billing rates, delivery of certain content, advertisements, or rules, and wherein the certain content is based at least in part on a geographical location associated with a service zone or a time of day or day of week.

17. The apparatus of claim 16, wherein the rules relate to filtering, screening, or security for providing data or communications to or from wireless devices in a service zone.

18. The apparatus of claim 14, wherein each of the access points is identified using an IP address, a MAC address, a proximate Cellsite Global Indicator (COI), or a Fully Qualified Domain Name (FQDN).

19. The apparatus of claim 14, wherein the one service zone includes a plurality of noncontiguous access points scattered throughout a geographical region.

20. The apparatus of claim 14, wherein the one device comprises a mobile telecommunications device associated with an International Mobile Subscriber Identity (IMSI) number, a Subscriber Identity Module (SIM) number, or a mobile phone number.

* * * * *